(12) United States Patent
Chan (10) Patent No.: US 11,144,139 B2
(45) Date of Patent: Oct. 12, 2021

(54) ELECTRONIC DEVICE AND ELECTRONIC SYSTEM

(71) Applicant: PEGATRON CORPORATION, Taipei (TW)

(72) Inventor: Hung-Lu Chan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 9 days.

(21) Appl. No.: 16/882,788

(22) Filed: May 26, 2020

(65) Prior Publication Data
US 2020/0401242 A1 Dec. 24, 2020

(30) Foreign Application Priority Data

Jun. 20, 2019 (TW) .................................. 108121468

(51) Int. Cl.
*G06F 3/0354* (2013.01)
*G06F 1/16* (2006.01)
*G06F 3/0362* (2013.01)
*G06F 3/038* (2013.01)

(52) U.S. Cl.
CPC ........ *G06F 3/03545* (2013.01); *G06F 1/1656* (2013.01); *G06F 3/038* (2013.01); *G06F 3/0362* (2013.01); *G06F 1/1616* (2013.01); *G06F 1/1643* (2013.01)

(58) Field of Classification Search
CPC .... G06F 3/03545; G06F 3/0362; G06F 3/038; G06F 1/1656; G06F 1/1616; G06F 1/1643
See application file for complete search history.

(56) References Cited

U.S. PATENT DOCUMENTS

| 5,436,954 | A | * | 7/1995 | Nishiyama | G06F 3/0362 455/566 |
|---|---|---|---|---|---|
| 2004/0135765 | A1 | * | 7/2004 | Kinerk | G06F 3/0487 345/156 |
| 2006/0152484 | A1 | * | 7/2006 | Borgward | G06F 3/03543 345/157 |
| 2008/0278443 | A1 | * | 11/2008 | Schelling | G06F 3/0338 345/157 |

(Continued)

FOREIGN PATENT DOCUMENTS

| CN | 103123545 | 5/2013 |
|---|---|---|
| CN | 104615278 | 5/2015 |

(Continued)

*Primary Examiner* — Ariel A Balaoing
(74) *Attorney, Agent, or Firm* — J.C. Patents (57) ABSTRACT

An electronic device includes a rod, a first sleeve, and a second sleeve. The rod has a first portion and a second portion. The first portion includes a touch head. The first sleeve is slidably sleeved on the first portion of the rod, and is movable between a first position and a second position of the first portion. When the first sleeve is at the first position, the electronic device is adapted to serve as a roller-type input device. A function of the roller-type input device is controlled according to information of the first sleeve or the second sleeve rotating relative to the rod. When the first sleeve is at the second position, the touch head is exposed from the first sleeve and enabled, so that the electronic device is adapted to serve as a stylus. In addition, an electronic system with the electronic device is also mentioned.

19 Claims, 10 Drawing Sheets

(56) References Cited

U.S. PATENT DOCUMENTS

| | | | | |
|---|---|---|---|---|
| 2012/0040713 A1* | 2/2012 | Wang | ............... | G06F 3/03545 |
| | | | | 455/550.1 |
| 2016/0291706 A1* | 10/2016 | Trutna | ............... | H02J 7/225 |
| 2016/0349862 A1* | 12/2016 | Harris | ............... | G06F 3/03545 |
| 2017/0123520 A1* | 5/2017 | Kim | ............... | G06F 3/0482 |
| 2019/0163291 A1* | 5/2019 | Chen | ............... | G06F 1/1616 |
| 2019/0227704 A1* | 7/2019 | Kuo | ............... | G06F 3/04883 |
| 2019/0346881 A1* | 11/2019 | Chai | ............... | G06F 1/1681 |
| 2020/0174529 A1* | 6/2020 | Goh | ............... | G06F 1/1643 |

FOREIGN PATENT DOCUMENTS

| | | |
|---|---|---|
| TW | M470291 | 1/2014 |
| TW | M486806 | 9/2014 |
| TW | 201827993 | 8/2018 |

\* cited by examiner

ELECTRONIC DEVICE AND ELECTRONIC SYSTEM

CROSS-REFERENCE TO RELATED APPLICATION

This non-provisional application claims priority under 35 U.S.C. § 119(a) to Patent Application No. 108121468 filed in Taiwan, R.O.C. on Jun. 20, 2019, the entire contents of which are hereby incorporated by reference.

BACKGROUND

Technical Field

The application relates to an electronic device and an electronic system, and in particular, to an electronic device with two usage modes and an electronic system with the electronic device.

Related Art

With the rapid development of touch display technologies, manufacturers of electronic systems such as notebook computers, mobile phones, and tablet computers tend to replace a traditional display panel with a touch display panel. During use of the touch display panel, in order to accurately hit the touch display panel, a stylus may be used for a touch operation. However, when is not used by a user, the stylus is mostly in an idle state. A function of the stylus cannot be well integrated with a function of an electronic system, and the stylus even occupies accommodating space in the electronic system.

Therefore, it is an important issue in design of an electronic system and a stylus to improve integration of the stylus and the electronic system and an application range of the stylus.

SUMMARY

The application provides an electronic device with two operation modes between which the electronic device can be quickly switched, so that a user more efficiently and conveniently uses the electronic device.

The application provides an electronic system including the electronic device.

The electronic device of the application includes a rod, a first sleeve, a second sleeve, and a processing unit. The rod has a first portion and a second portion opposite to each other. The first portion includes a touch head. The first sleeve is slidably sleeved on the first portion of the rod, and is movable between a first position and a second position of the first portion. When the first sleeve is at the first position, the first sleeve covers the touch head and is rotatable relative to the rod. When the first sleeve is at the second position, the touch head is enabled. The second sleeve is sleeved on the second portion of the rod. The second sleeve is rotatable relative to the rod. The processing unit is disposed inside the rod and is adapted to receive information of the first sleeve or the second sleeve rotating relative to the rod. When the first sleeve is at the first position, the electronic device is adapted to serve as a roller-type input device. A function of the roller-type input device is controlled according to information of the first sleeve or the second sleeve rotating relative to the rod. When the first sleeve moves toward the second sleeve to the second position, the touch head is exposed from the first sleeve, and the touch head is enabled, so that the electronic device is adapted to serve as a stylus.

In an embodiment of the application, the rod comprises an outer surface, a first slide rail recessed and surrounding the outer surface and a plurality of first positioning slots recessed at a bottom surface of the first slide rail. The first sleeve comprises an inner surface and a plurality of first bumps located on the inner surface, the first bumps are adapted to slide along the first slide rail to be selectively engaged with the first positioning slots.

In an embodiment of the application, the electronic device further includes a first drive mechanism and a first switcher. The first drive mechanism includes at least one first magnetic member and at least one second magnetic member. The first magnetic member is disposed inside the rod. The second magnetic member is disposed at the first sleeve. When the first sleeve is at the first position, the second magnetic member is aligned with the first magnetic member. The first switcher is disposed inside the rod and is linked to the first magnetic member. When the first sleeve is at the first position, the second magnetic member magnetically attracts the first magnetic member. When the first sleeve rotates, the second magnetic member drives the first magnetic member to rotate, and the first switcher rotates relative to the rod with the first sleeve through magnetically attraction between the at least one first magnetic member and the at least one second magnetic member. The processing unit is adapted to receive rotation information of the first switcher to obtain the information of the first sleeve rotating relative to the rod.

In an embodiment of the application, the electronic device further includes a first sensor. The first sensor is disposed inside the rod, close to the first switcher, and electrically connected to the processing unit. When the first sleeve is at the first position and the first switcher rotates relative to the rod with the first sleeve, the first sensor transmits a position signal of the first switcher to the processing unit to switch the function of the roller-type input device.

In an embodiment of the application, the first portion of the rod further includes a plurality of second slide rails and at least one third magnetic member. The second slide rails are recessed at the outer surface of the rod along a direction in which the rod extends, and each of the second slide rails has a front end and a back end opposite to each other. Each of the front ends is disposed on the first slide rail, and each of the back ends has a third positioning slot recessed at a bottom surface of the corresponding second slide rail. The third magnetic member is disposed inside the rod and corresponds to the back end. During movement of the first sleeve from the first position to the second position, each of the first bumps moves to the corresponding third positioning slot through the corresponding second slide rail. When the first sleeve is at the second position, the third magnetic member magnetically attracts the second magnetic member.

In an embodiment of the application, the rod comprises an outer surface, and includes a third slide rail recessed and surrounding the outer surface and a plurality of second positioning slots recessed at a bottom surface of the third slide rail. The second sleeve comprises an inner surface and a plurality of second bumps located on the inner surface and corresponding to the second positioning slots. The second bumps are adapted to slide along the third slide rail to be engaged with the second positioning slots.

In an embodiment of the application, the electronic device further includes a second drive mechanism and a second switcher. The second drive mechanism includes at least one fourth magnetic member and at least one fifth magnetic member. The fourth magnetic member is disposed inside the rod. The fifth magnetic member is disposed at the second sleeve, the fourth magnetic member being aligned with the fifth magnetic member. The second switcher is disposed inside the rod and is linked to the fourth magnetic member. The fourth magnetic member magnetically attracts the fifth magnetic member. When the second sleeve rotates, the fifth magnetic member drives the fourth magnetic member to rotate, and the second switcher rotates relative to the rod with the second sleeve through magnetically attraction between the at least one fourth magnetic member and the at least one fifth magnetic member. The processing unit is adapted to receive rotation information of the second switcher to obtain the information of the second sleeve rotating relative to the rod.

In an embodiment of the application, the electronic device further includes a second sensor. The second sensor is disposed inside the rod, close to the second switcher, and electrically connected to the processing unit. When the second switcher rotates relative to the rod with the second sleeve, the second sensor transmits a position signal of the second switcher to the processing unit to switch the function of the roller-type input device.

In an embodiment of the application, the electronic device further includes a first communication module. The first communication module is disposed inside the rod and is electrically connected to the processing unit.

An electronic system of the application includes the foregoing electronic device and a body. The electronic device includes a first communication module disposed inside the rod. The body has an accommodating slot. The body includes a second communication module in a signal connection to the first communication module; and the electronic device is detachably disposed in the accommodating slot.

In an embodiment of the application, the body further includes a fixing member and a lever. The fixing member is movably disposed inside the accommodating slot. The fixing member is adapted to fix a central portion located between the first portion and the second portion of the rod. The lever has a first end and a second end opposite to the first end. The second end is connected to the fixing member. The first end is adapted to move downward to lift the fixing member connected to the second end. When the central portion of the electronic device is fixed to the fixing member and the fixing member is lifted, the first sleeve and the second sleeve of the electronic device partially protrude from the accommodating slot.

In an embodiment of the application, the body further includes a power source, an electromagnet, and a magnetic member. The electromagnet is electrically connected to the power source. The magnetic member is located beside the electromagnet and is connected to the first end of the lever. When the central portion of the electronic device is fixed to the fixing member and the power source is turned off, the electromagnet does not magnetically attract the magnetic member, and the first sleeve and the second sleeve of the electronic device are located inside the accommodating slot. When the power source is turned on, the electromagnet is magnetically attracted to the magnetic member, so that the magnetic member drives the lever to move, so that the first sleeve and the second sleeve of the electronic device partially protrude from the accommodating slot.

Based on the above, in the electronic device of the application, when the first sleeve is at the first position, the first sleeve and the second sleeve can rotate relative to the rod respectively. In this case, the electronic device can serve as a roller-type input device, and the function of the roller-type input device is controlled according to rotation of the first sleeve and the second sleeve relative to the rod. When the first sleeve moves toward the second sleeve to the second position, the touch head is exposed from the first sleeve, and the touch head is enabled, so that the electronic device can serve as a stylus. In this way, according to the electronic device of the application, a position of the first sleeve may be adjusted to implement switching between the two different modes of the roller-type input device and the stylus.

In order to make the foregoing features and advantages of the application more apparent and easier to understand, a detailed description of embodiments is given below with reference to the accompanying drawings.

DETAILED DESCRIPTION OF THE EMBODIMENTS

Generally, in order to help a user store a stylus equipped on a traditional electronic system, the electronic system has an accommodating space or an external bag with a magnetic member for storing the stylus. However, the method has a disadvantage that when not used by a user, the stylus is in an idle state. A function of the stylus cannot be well integrated with a function of the electronic system, and the stylus even occupies accommodating space in the electronic system. The application provides an electronic device and an electronic system module to resolve the foregoing problem.

Figure 1A:
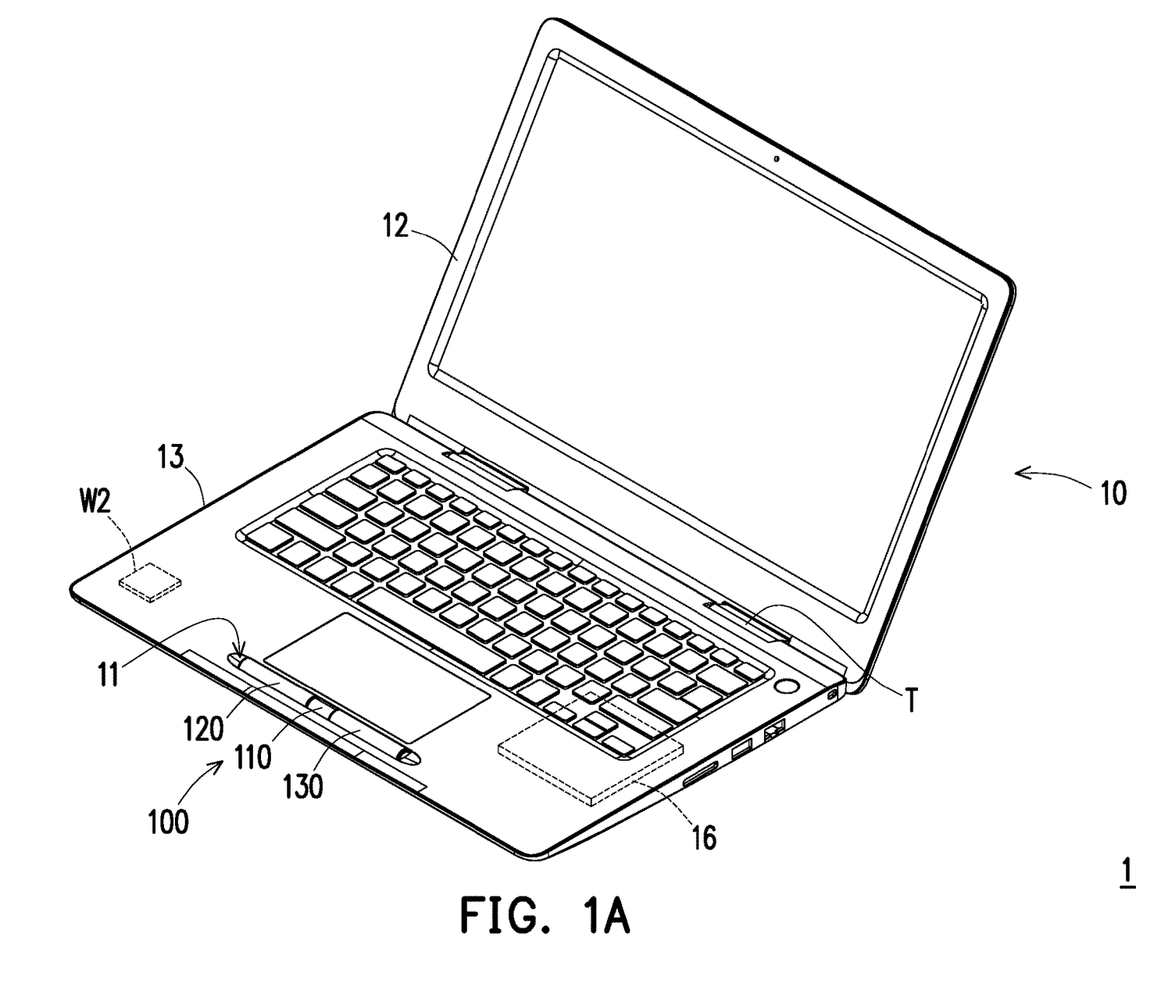
FIG. 1A is a three-dimensional schematic diagram of an electronic system with an electronic device according to an embodiment of the application.
Figure 1B:
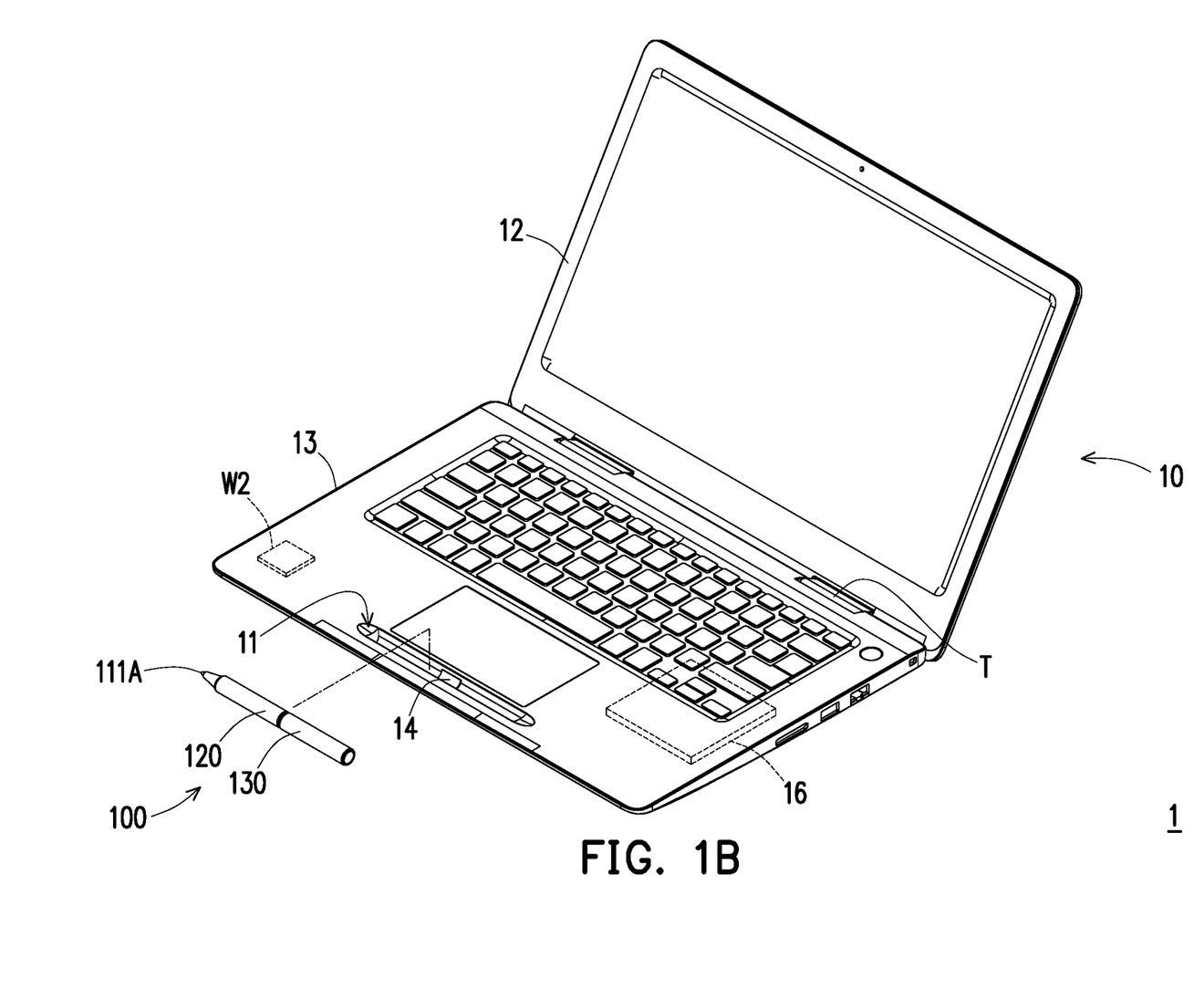
FIG. 1B is a three-dimensional schematic diagram of the electronic device in FIG. 1A separated from the electronic system.

FIG. 1A is a three-dimensional schematic diagram of an electronic system with an electronic device according to an embodiment of the application. FIG. 1B is a three-dimensional schematic diagram of the electronic device in FIG. 1A separated from the electronic system. Referring to FIG. 1A to FIG. 1B, an electronic system 1 in this embodiment includes a body 10. The body 10 has an accommodating slot 11, and includes an upper body 12 and a lower body 13. The upper body 12 and the lower body 13 are pivotally connected to each other by a pivot axis T. The accommodating slot 11 is disposed at the lower body 13 and is parallel to the pivot axis T. The electronic device 100 is detachably disposed in the accommodating slot 11. In this embodiment, the electronic system 1 is a notebook computer, but in other embodiments, the electronic system 1 may also be a tablet computer. The application is not limited thereto.

Figure 2A:
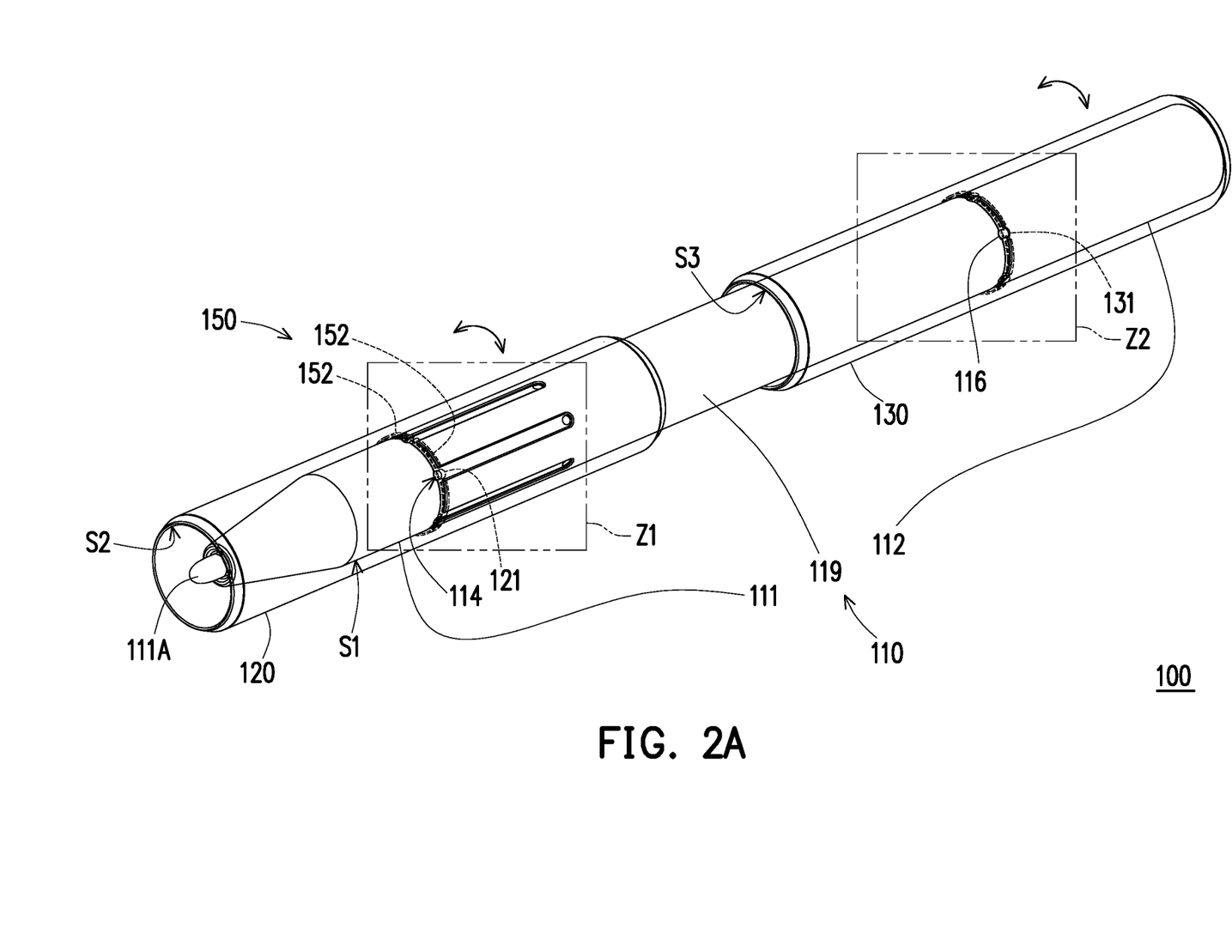
FIG. 2A is a schematic perspective view of the electronic device in FIG. 1A.
Figure 2B:
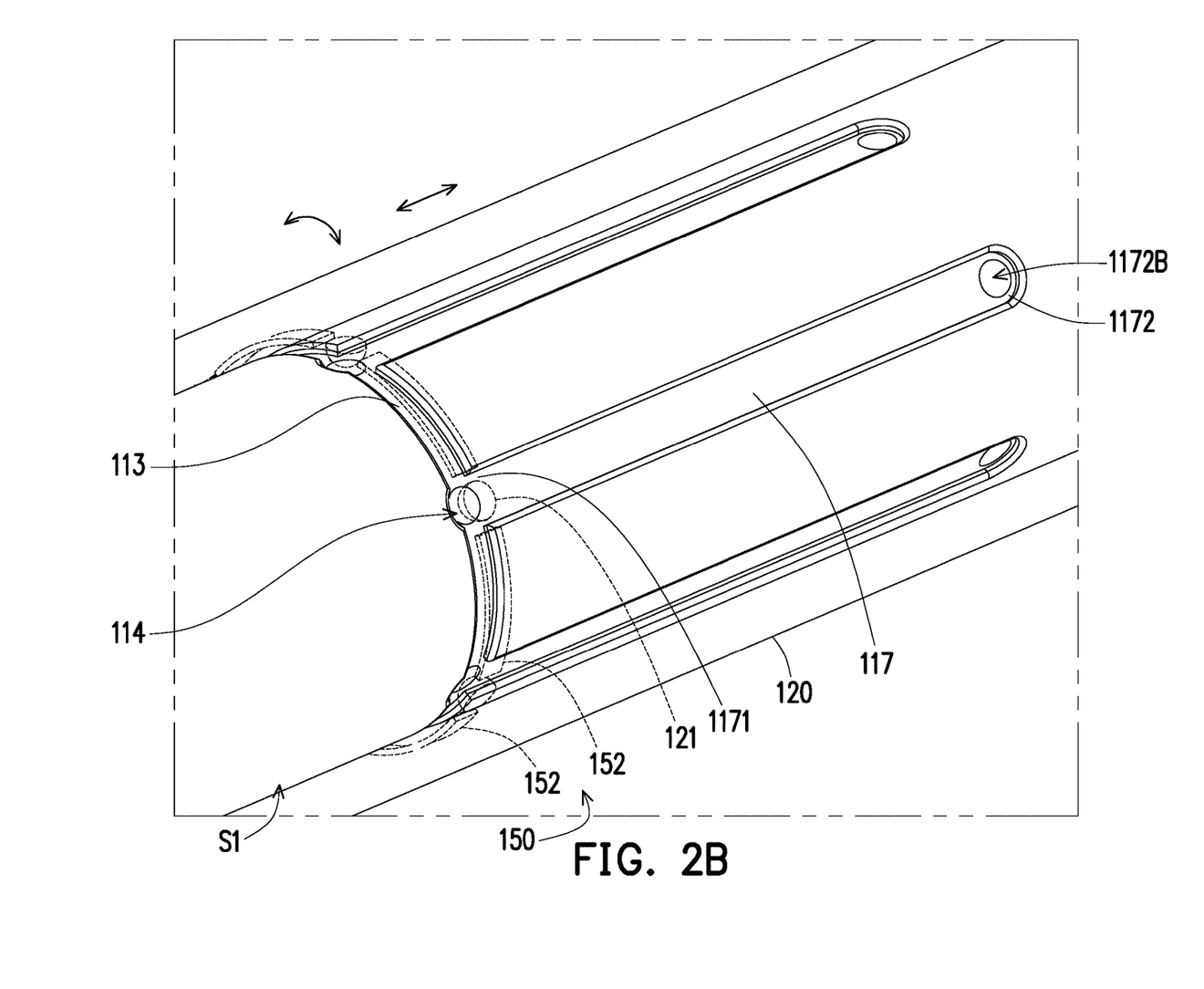
FIG. 2B is a schematic enlarged view of an area Z1 in FIG. 2A.
Figure 2C:
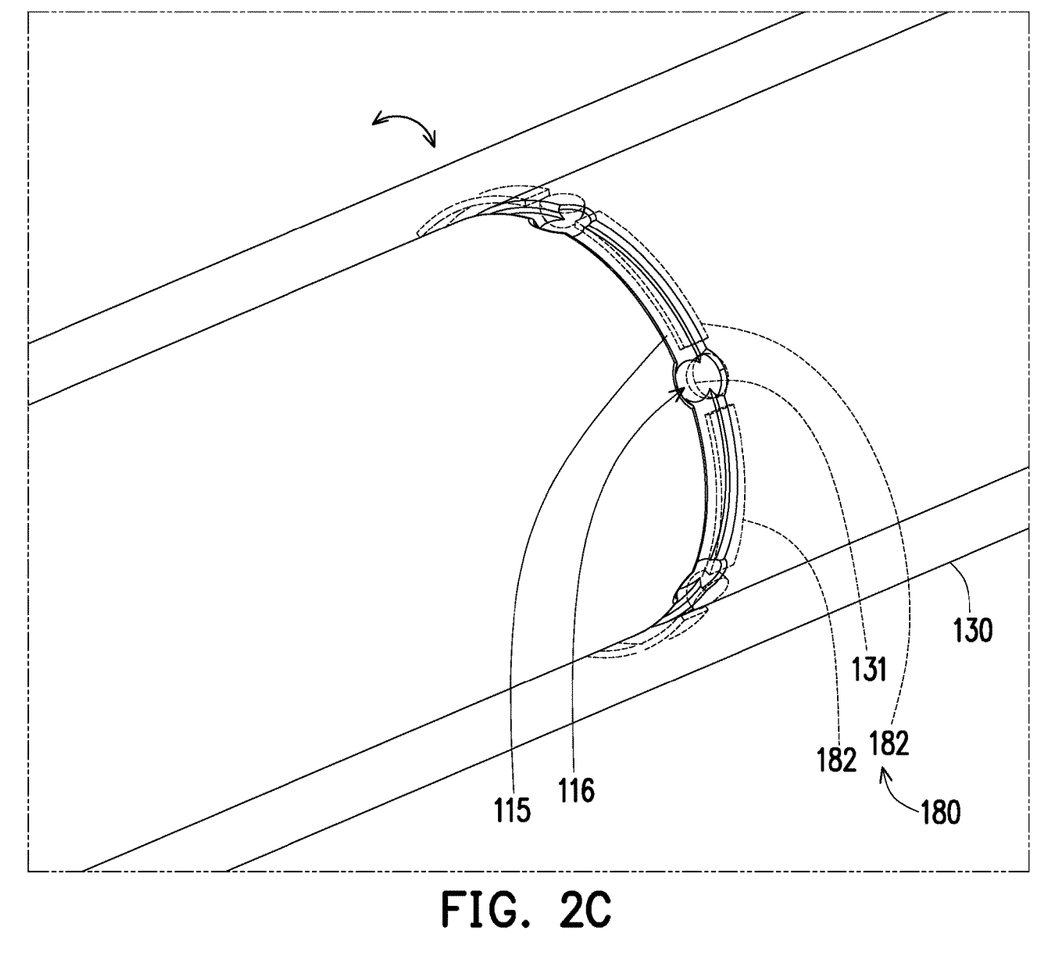
FIG. 2C is a schematic enlarged view of an area Z2 in FIG. 2A.
Figure 3A:
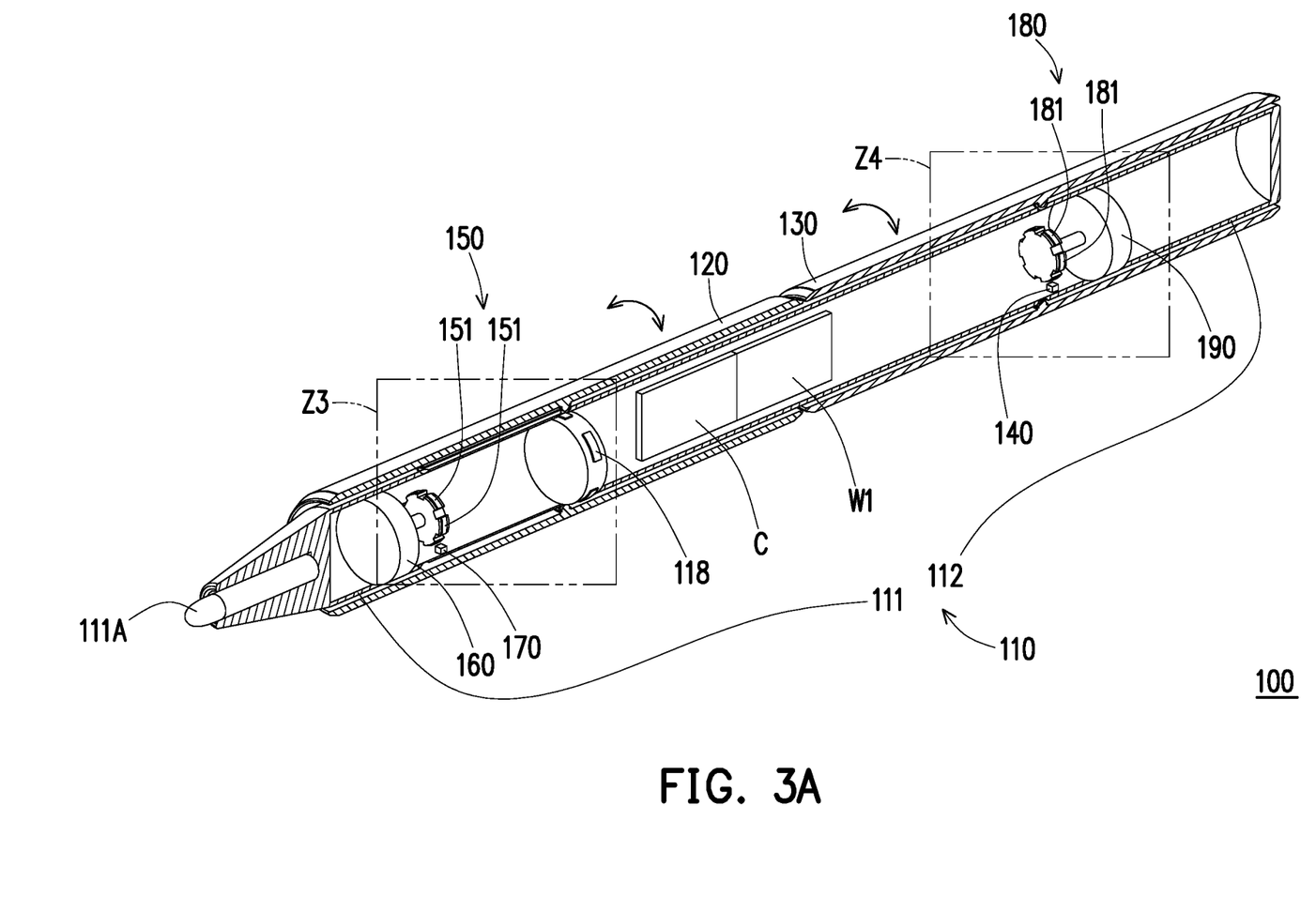
FIG. 3A is a schematic cross-sectional view of the electronic device in FIG. 1A.
Figure 3B:
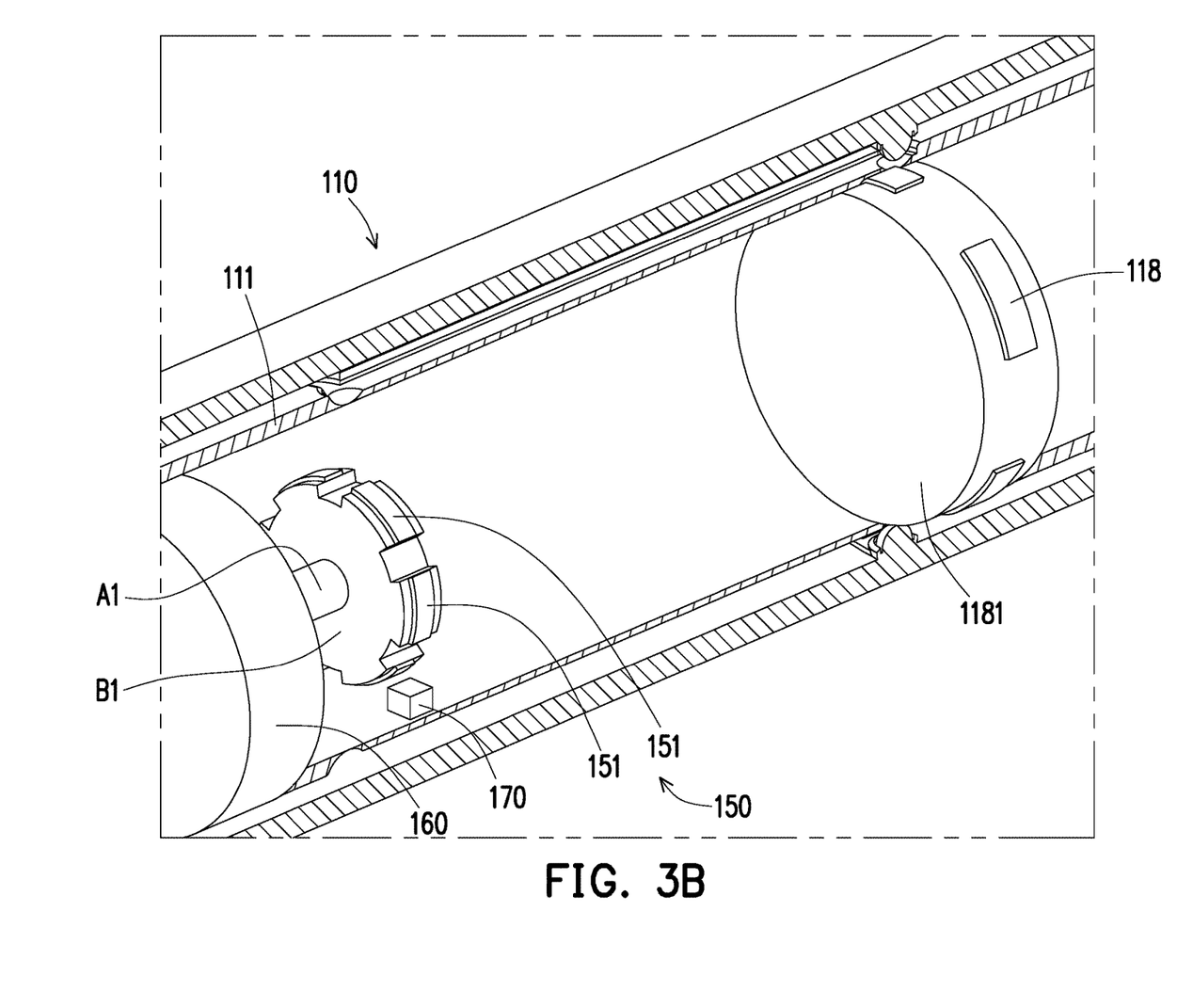
FIG. 3B is a schematic cross-sectional view of an area Z3 in FIG. 3A.
Figure 3C:
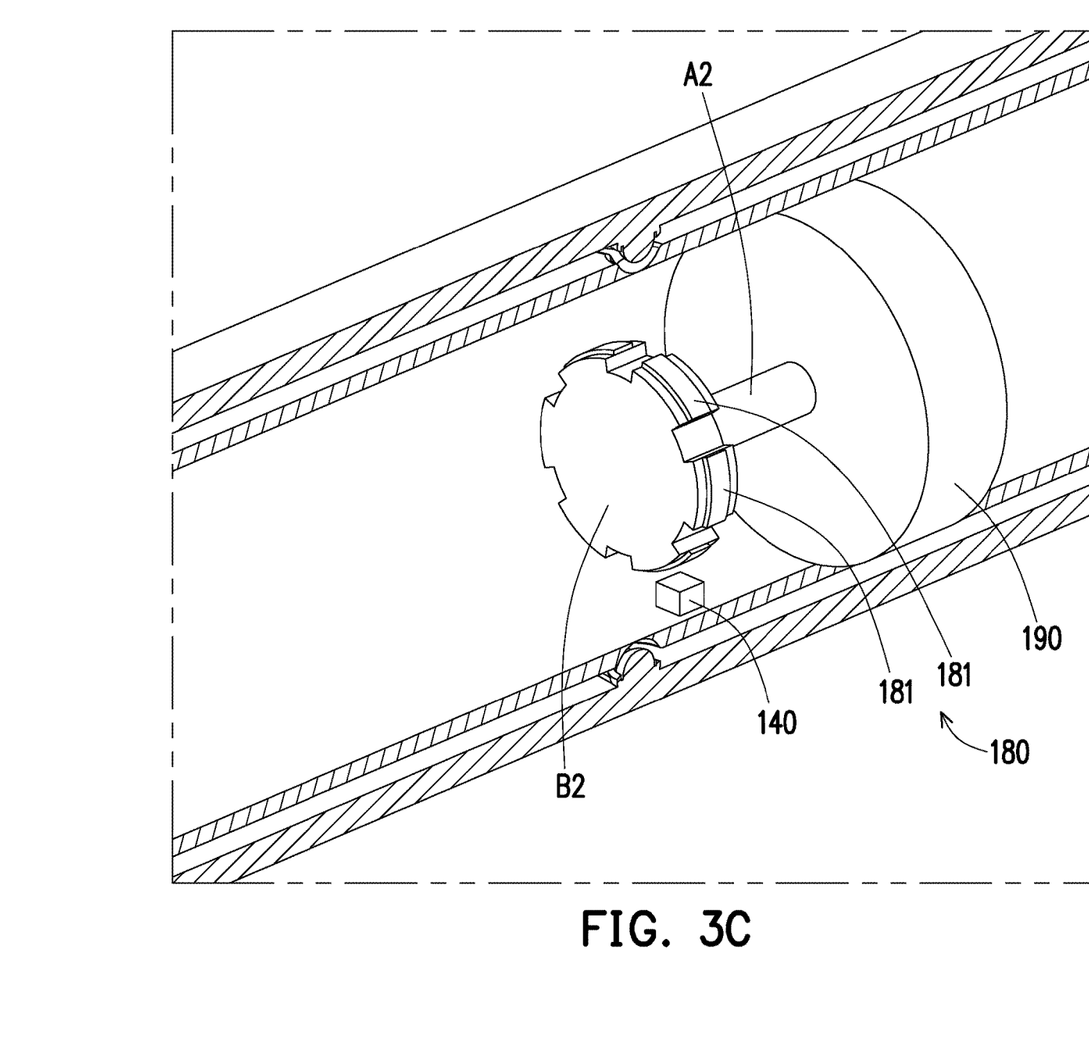
FIG. 3C is a schematic cross-sectional view of an area Z4 in FIG. 3A.

FIG. 2A is a schematic perspective view of the electronic device in FIG. 1A. FIG. 2B is a schematic enlarged view of an area Z1 in FIG. 2A. FIG. 2C is a schematic enlarged view of an area Z2 in FIG. 2A. FIG. 3A is a schematic cross-sectional view of the electronic device in FIG. 1A. FIG. 3B is a schematic cross-sectional view of an area Z3 in FIG. 3A. FIG. 3C is a schematic cross-sectional view of an area Z4 in FIG. 3A. It should be noted that, in FIG. 2A to FIG. 2C, a first sleeve 120 and a second sleeve 130 are transparent so that an internal structure of the electronic device 100 is shown more clearly.

Referring to FIG. 2A to FIG. 3C, in this embodiment, the electronic device 100 includes a rod 110, a first sleeve 120, and a second sleeve 130. The rod 110 has a first portion 111 and a second portion 112 opposite to each other. The first portion 111 includes a touch head 111A for touching a display panel.

As shown in FIG. 2A and FIG. 3A, the first sleeve 120 is slidably sleeved on the first portion 111 of the rod 110. The first sleeve 120 moves between a first position of the first portion 111 shown in FIG. 2A and a second position of the first portion 111 shown in FIG. 3A. When the first sleeve 120 is at the first position shown in FIG. 2A, the first sleeve 120 covers the touch head 111A and is rotatable relative to the rod 110. When the first sleeve 120 is at the second position shown in FIG. 3A, the touch head 111A is enabled. In this embodiment, the electronic device 100 further includes a processing unit C (FIG. 3A). The processing unit C is a controller. However, in other embodiments, the processing unit C may be a central processing unit (CPU) or other processors. The application is not limited thereto. The processing unit C may be configured on a circuit board (not shown).

In this embodiment, when the first sleeve 120 is at the first position shown in FIG. 2A, the first sleeve 120 is rotatable relative to the rod 110. The second sleeve 130 is sleeved on the second portion 112 of the rod 110. The second sleeve 130 is rotatable relative to the rod 110. The processing unit C is disposed inside the rod 110 and may receive information of the first sleeve 120 or the second sleeve 130 rotating relative to the rod 110.

It is worth mentioning that, when the first sleeve 120 is at the first position shown in FIG. 2A, the electronic device 100 can serve as a roller-type input device, and a function of the roller-type input device is controlled according to rotation of the first sleeve 120 and the second sleeve 130 relative to the rod 110. For example, a user may adjust display information of the upper body 12, control a volume and a sound, or perform other functions by rolling the first sleeve 120 or the second sleeve 130.

In addition, when the first sleeve 120 moves toward the second sleeve 130 to the second position shown in FIG. 3A, the touch head 111A is exposed from the first sleeve 120, and the touch head 111A is enabled, so that the electronic device 100 can serve as a stylus. In this case, the user may switch a brush type, a size, or a color of the stylus by rolling the second sleeve 130.

In other words, as shown in FIG. 1A, when the electronic device 100 is placed in the accommodating slot 11, the electronic device 100 can serve as a roller-type input device. The electronic device 100 is not idle and therefore does not waste a space of the electronic system 1, so that the electronic device 100 and the electronic system 1 are well integrated. As shown in FIG. 1B, when a user wants to use the electronic device 100 as a stylus, the user may detach the electronic device 100 from the accommodating slot 11, and the electronic device may serve a stylus to touch a screen based on the second position of the first sleeve 120 shown in FIG. 3A, or may serve as a roller-type input device to control a volume or perform other functions based on the first position shown in FIG. 2A.

In this way, according to the electronic device 100 in this embodiment, a position of the first sleeve 120 may be adjusted to quickly and easily switch the electronic device between the two different modes of the roller-type input device and the stylus, thereby enhancing integration between the electronic device 100 and the body 10 and increasing interface functions of the electronic system 1 through the electronic device 100.

In particular, as shown in FIG. 2A and FIG. 2B, in this embodiment, the rod 110 includes an outer surface S1, a first slide rail 113 recessed and surrounding the outer surface S1 and a plurality of first positioning slots 114 recessed at a bottom surface of the first slide rail 113. The first sleeve 120 includes an inner surface S2 and a plurality of first bumps 121 located on the inner surface S2. The first bumps 121 can slide along the first slide rail 113 to be selectively engaged with the first positioning slots 114.

In this embodiment, the first bump 121 has a semicircular outer contour, and the first positioning slot 114 has a semicircular inner contour. However, in other embodiments, the contours may have any shape provided that the first bump 121 and the first positioning slot 114 can be engaged with each other. The application is not limited thereto. In this embodiment, there are respectively six first positioning slots 114 and first bumps 121. However, in other embodiments, numbers of the first positioning slots 114 and the first bumps 121 may be determined according to process requirements, provided that the number of the first positioning slots 114 corresponds to the number of the first bumps 121. The application is not limited thereto.

As shown in FIG. 2A, FIG. 2B, FIG. 3A, and FIG. 3B, in this embodiment, the electronic device 100 further includes a first drive mechanism 150, a first switcher 160, and a first sensor 170. The first drive mechanism 150 includes at least one first magnetic member 151 (FIG. 3B), at least one second magnetic member 152 (FIG. 2B), a linking rod A1 (FIG. 3B), and a plate B1 (FIG. 3B). In this embodiment, the first magnetic member 151 is disposed at the plate B1 and is located inside the rod 110. The second magnetic member 152 is disposed on the inner surface S2 of the first sleeve 120. When the first sleeve 120 is at the first position shown in FIG. 2A, the second magnetic member 152 is aligned with the first magnetic member 151.

In this embodiment, the first magnetic member 151 and the second magnetic member 152 are magnets with different magnetic poles. There are respectively six first magnetic members 151 and second magnetic members 152. However, in other embodiments, one of the first magnetic member 151 and the second magnetic member 152 may also be a magnet, and the other may be metal that may be magnetically attracted. In addition, there may be respectively one first magnetic member 151 and second magnetic member 152, which are magnets with a relatively strong magnetic attraction force attracted to each other. The number of the first magnetic members 151 and the number of the second magnetic members 152 are not limited thereto.

In this embodiment, the first switcher 160 is disposed inside the rod 110 and is connected to the plate B1 through the linking rod A1 to be linked to the first magnetic member 151. When the first sleeve 120 is at the first position shown in FIG. 2A, the first magnetic member 151 magnetically attracts the second magnetic member 152. When the first sleeve 120 rotates, the second magnetic member 152 drives the first magnetic member 151 to rotate, the first switcher 160 rotates relative to the rod 110 with the first sleeve 120 through magnetically attraction between the at least one first magnetic member 151 and the at least one second magnetic member 152. The processing unit C may receive rotation information of the first switcher 160 to obtain the information of the first sleeve 120 rotating relative to the rod 110.

In particular, the processing unit C senses the rotation of the first switcher 160 through the first sensor 170. In this embodiment, the first sensor 170 is disposed inside the rod 110 and is close to the first switcher 160. The first sensor 170 is electrically connected to the processing unit C. When the first sleeve 120 is at the first position shown in FIG. 2A, the first switcher 160 rotates relative to the rod 110 with the first sleeve 120 through magnetically attraction between the at least one first magnetic member 151 and the at least one second magnetic member 152. The processing unit C may receive the rotation information of the first switcher 160. In other words, the first sensor 170 transmits a position signal of the first switcher 160 to the processing unit C, to switch the roller-type input device. The first sensor 170 is, for example, a motion sensor, a light sensor, or other sensors.

In addition, as shown in FIG. 2A and FIG. 2C, in this embodiment, the rod 110 further includes a third slide rail 115 recessed and surrounding the outer surface S1 and a plurality of second positioning slots 116 recessed at a bottom surface of the third slide rail 115. The second sleeve 130 includes a plurality of second bumps 131 located on the inner surface S3 and corresponding to the second positioning slots 116. The second bumps 131 can slide along the third slide rail 115 to be engaged with the second positioning slots 116.

In this embodiment, the second bump 131 has a semicircular outer contour, and the second positioning slot 116 has a semicircular inner contour. However, in other embodiments, the contours may have any shape provided that the second bump 131 and the second positioning slot 116 can be engaged with each other. The application is not limited thereto. In this embodiment, there are respectively six second positioning slots 116 and second bumps 131. However, in other embodiments, numbers of the second positioning slots 116 and the second bumps 131 may be determined according to process requirements, provided that the number of the second positioning slots 116 corresponds to the number of the second bumps 131. The application is not limited thereto.

As shown in FIG. 2A, FIG. 2C, FIG. 3A, and FIG. 3C, in this embodiment, the electronic device 100 further includes a second drive mechanism 180, a second switcher 190, and a second sensor 140. The second drive mechanism 180 includes at least one fourth magnetic member 181 (FIG. 3C), at least one fifth magnetic member 182 (FIG. 2C), a linking rod A2 (FIG. 3C), and a plate B2 (FIG. 3C). In this embodiment, the fourth magnetic member 181 is disposed at the plate B2 and is located inside the rod 110. The fifth magnetic member 182 is disposed on the inner surface S3 of the second sleeve 130, and the fourth magnetic member 181 is aligned with the fifth magnetic member 182.

In this embodiment, the fourth magnetic member 181 and the fifth magnetic member 182 are magnets with different magnetic poles. There are respectively six fourth magnetic members 181 and fifth magnetic members 182. However, in other embodiments, one of the fourth magnetic member 181 and the fifth magnetic member 182 may also be a magnet, and the other may be metal that may be magnetically attracted. In addition, there may be respectively one fourth magnetic member 181 and fifth magnetic member 182, which are magnets with a relatively strong magnetic attraction force attracted to each other. The number of the fourth magnetic members 181 and the number of the fifth magnetic members 182 are not limited thereto.

In this embodiment, the second switcher 190 is disposed inside the rod 110 and is connected to the plate B2 through the linking rod A2 to be linked to the fourth magnetic member 181. The fourth magnetic member 181 magnetically attracts the fifth magnetic member 182. When the second sleeve 130 rotates, the fifth magnetic member 182 drives the fourth magnetic member 181 to rotate, the second switcher 190 rotates relative to the rod 110 with the second sleeve 130 through magnetically attraction between the at least one fourth magnetic member 181 and the at least one fifth magnetic member 182. The second sensor 140 is disposed inside the rod 110 and is close to the second switcher 190. The second sensor 140 is electrically connected to the processing unit C. When the second switcher 190 rotates relative to the rod 110 with the second sleeve 130, the processing unit C can receive rotation information of the second switcher 190 to obtain the information of the second sleeve 130 rotating relative to the rod 110. In other words, the second sensor 140 transmits a position signal of the second switcher 190 to the processing unit C, to switch the roller-type input device.

It is worth mentioning that, as shown in FIG. 2B and FIG. 3B, in this embodiment, the rod 110 further includes a plurality of second slide rails 117 (FIG. 2B) and at least one third magnetic member 118 (FIG. 3B). The second slide rails 117 are recessed at the outer surface S1 of the rod 110 along a direction in which the rod 110 extends. In this embodiment, there are six third magnetic members 118 correspondingly disposed at an outer edge of a supporting member 1181. However, in other embodiments, there may be one third magnetic member 118 disposed at the supporting member 1181. The application is not limited thereto.

In this embodiment, each of the second slide rails 117 has a front end 1171 and a back end 1172 opposite to each other. Each of the front ends 1171 is connected to the first slide rail 113, and each of the back ends 1172 includes a third positioning slot 1172B recessed at a bottom surface of the corresponding second slide rail 117. The third magnetic member 118 is disposed inside the rod 110 and corresponds to the back end 1172. During movement of the first sleeve 120 from the first position shown in FIG. 2A to the second position shown in FIG. 3A, each of the first bumps 121 moves to the corresponding third positioning slot 1172B through the corresponding second slide rail 117. When the first sleeve 120 is at the second position shown in FIG. 3A, the third magnetic member 118 magnetically attracts the second magnetic member 152 so that the first sleeve 120 is fixed at a position relative to the rod 110.

Referring to FIG. 3A, in this embodiment, the electronic device 100 further includes a first communication module W1. The first communication module W1 is disposed inside the rod 110 and is electrically connected to the processing unit C. Referring to FIG. 1A, the body 10 further includes a second communication module W2 that is in a signal connection to the first communication module W1. In other words, the electronic device 100 and the body 10 may be in a signal connection to each other through the first communication module W1 and the second communication module W2. In this embodiment, the first communication module W1 and the second communication module W2 are wireless communication modules, and may transmit a signal to each other through Bluetooth. However, in other embodiments, the first communication module W1 and the second communication module W2 may also be wired communication modules. The application is not limited thereto.

Figure 4A:
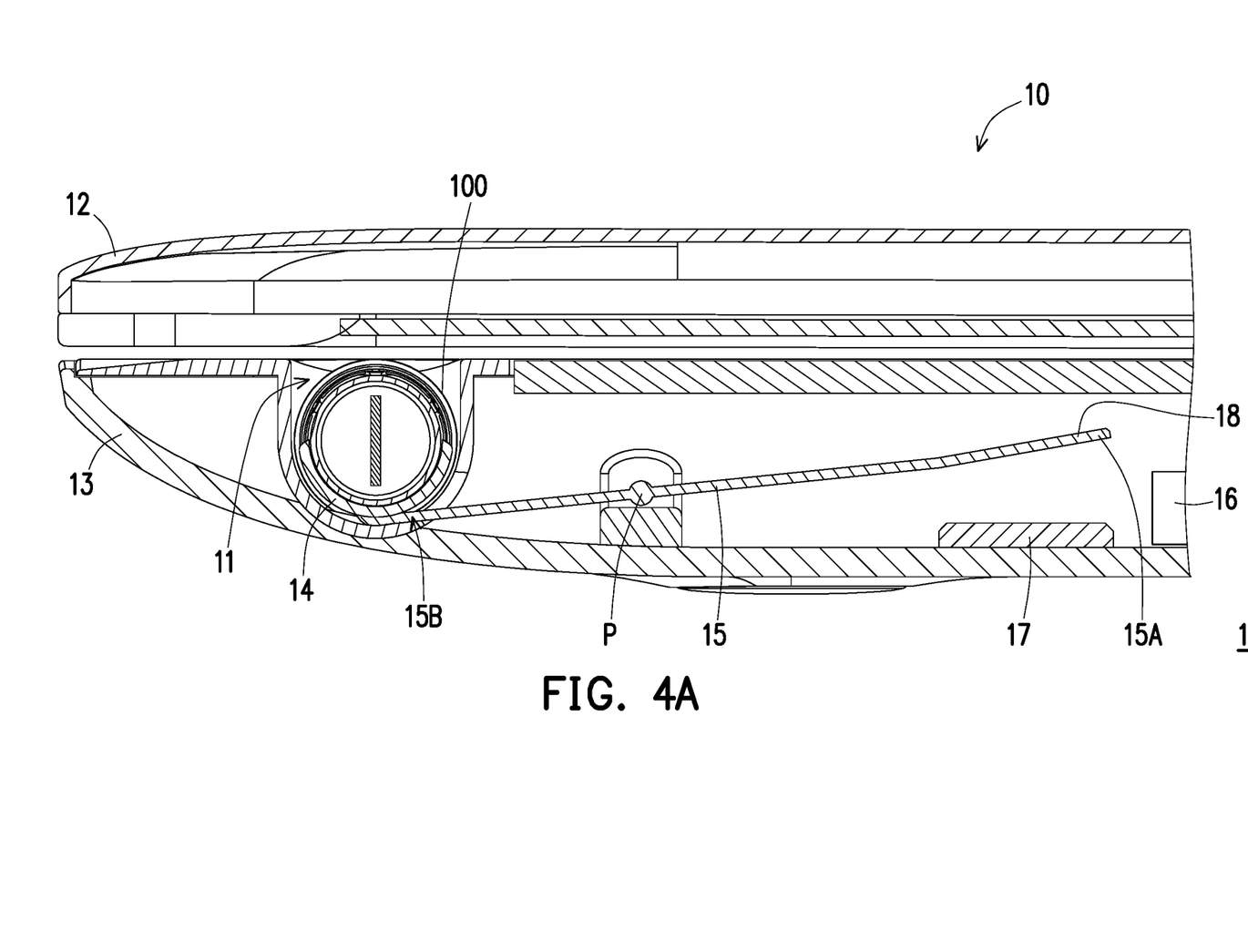
FIG. 4A to FIG. 4B are schematic enlarged cross-sectional views of the electronic system in FIG. 1A in different states.
Figure 4B:
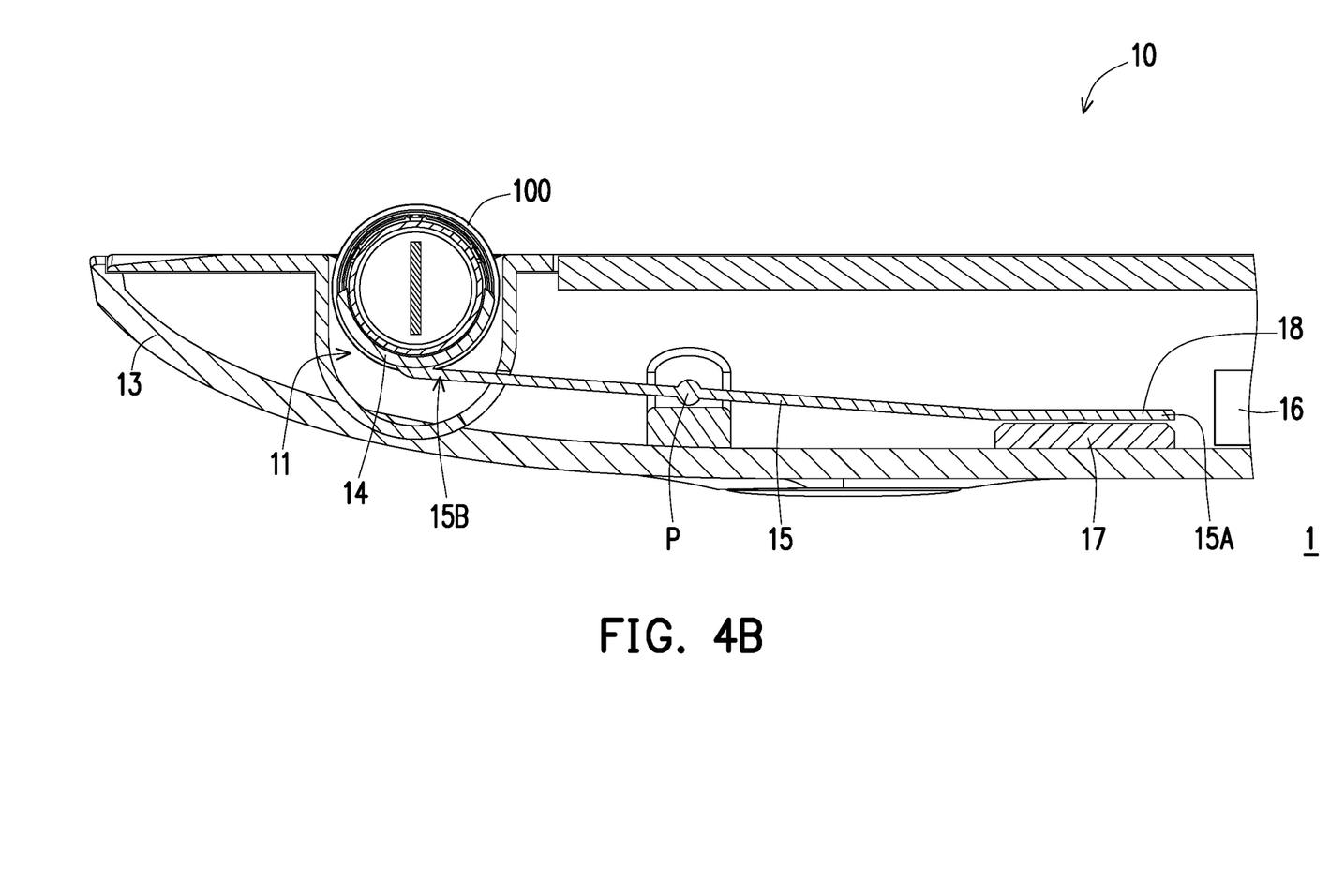

FIG. 4A to FIG. 4B are schematic enlarged cross-sectional views of the electronic system in FIG. 1A in different states. Referring to FIG. 4A to FIG. 4B, the body 10 of the electronic system 1 in this embodiment further includes a fixing member 14, a lever 15, a power source 16, an electromagnet 17, and a magnetic member 18. The fixing member 14 is movably disposed inside the accommodating slot 11. In this embodiment, the fixing member 14 is an arc-shaped plate, but the application is not limited thereto. As shown in FIG. 2A, the fixing member 14 can fix a central portion 119 (FIG. 2A) located between the first portion 111 and the second portion 112 of the rod 110. However, in other embodiments, a form of the fixing member 14 is not limited thereto provided that the fixing member 14 can fix the central portion 119.

In this embodiment, the lever 15 has a first end 15A and a second end 15B opposite to the first end 15A and a supporting point P located between the first end 15A and the second end 15B. The lever 15 is supported by the supporting point P, and the second end 15B of the lever 15 is connected to the fixing member 14. The first end 15A can move downward to lift the fixing member 14 connected to the second end 15B. When the central portion 119 of the rod 110 is fixed to the fixing member 14 and the fixing member 14 is lifted, the first sleeve 120 (FIG. 1A) and the second sleeve 130 (FIG. 1A) of the electronic device 100 partially protrude from the accommodating slot 11.

In particular, the electromagnet 17 is electrically connected to the power source 16. The magnetic member 18 is located beside the electromagnet 17 and is connected to the first end 15A of the lever 15. When the central portion 119 of the rod 110 is fixed to the fixing member 14 and the power source 16 of the electronic system 1 is turned off, the electromagnet 17 does not magnetically attract the magnetic member 18, and the first sleeve 120 and the second sleeve 130 of the electronic device 100 are located in the accommodating slot 11, so that the upper body 12 does not interfere with the lower body 13 during closing. When the power source 16 of the electronic system 1 is enabled, the electromagnet 17 is magnetically attracted to the magnetic member 18, and the magnetic member 18 drives the lever 15 to move, so that the first sleeve 120 and the second sleeve 130 of the electronic device 100 partially protrude from the accommodating slot 11, facilitating use by a user, which is shown in FIG. 1A. In this embodiment, the electronic device 100 is driven through a magnetic attraction force. However, in other embodiments, the electronic device 100 may also be driven to lift or lower using a pushing or pulling structure through a mechanical force.

In summary, in the electronic device of the application, when the first sleeve is at the first position, the first sleeve and the second sleeve can rotate relative to the rod respectively. In this case, the electronic device can serve as a roller-type input device, and the function of the roller-type input device is controlled according to rotation of the first sleeve or the second sleeve relative to the rod. When the first sleeve moves toward the second sleeve to the second position, the touch head is exposed from the first sleeve, and the touch head is enabled, so that the electronic device can serve as a stylus. In this way, according to the electronic device of the application, switching between two modes of the roller-type input device and the stylus can be quickly achieved through adjustment of the position of the first sleeve and a signal connection between the first communication module of the electronic device and the second communication module of the electronic system.

Although the application has been disclosed with the foregoing embodiments, the embodiments are not intended to limit the application. One of ordinary skill in the art may make some changes and modifications without departing from the spirit and scope of the application. Therefore, the protection scope of the application is subject to the appended claims.

What is claimed is:

1. An electronic device, comprising:
a rod having a first portion and a second portion opposite to each other, wherein the first portion comprises a touch head;
a first sleeve slidably sleeved on the first portion of the rod and movable between a first position and a second position of the first portion, wherein when the first sleeve is at the first position, the first sleeve covers the touch head and is rotatable relative to the rod, and when the first sleeve is at the second position, the touch head is enabled;
a second sleeve sleeved on the second portion of the rod, wherein the second sleeve is rotatable relative to the rod; and
a processing unit disposed inside the rod and adapted to receive information of the first sleeve or the second sleeve rotating relative to the rod, wherein
when the first sleeve is at the first position, the electronic device is adapted to serve as a roller-type input device, a function of the roller-type input device being controlled according to the information of the first sleeve or the second sleeve rotating relative to the rod; and
when the first sleeve moves toward the second sleeve to the second position, the touch head is exposed from the first sleeve, and the touch head is enabled, so that the electronic device is adapted to serve as a stylus.

2. The electronic device according to claim 1, wherein the rod comprises an outer surface, a first slide rail recessed and surrounding the outer surface and a plurality of first positioning slots recessed at a bottom surface of the first slide rail, and the first sleeve comprises an inner surface and a plurality of first bumps located on the inner surface, the first bumps are adapted to slide along the first slide rail to be selectively engaged with the first positioning slots.

3. The electronic device according to claim 2, further comprising:
a first drive mechanism comprising:
at least one first magnetic member disposed inside the rod; and
at least one second magnetic member disposed at the first sleeve, wherein when the first sleeve is at the first position, the at least one second magnetic member is aligned with the at least one first magnetic member; and
a first switcher disposed inside the rod and linked to the first magnetic member, wherein when the first sleeve is at the first position, the at least one second magnetic member magnetically attracts the at least one first magnetic member, when the first sleeve rotates, the at least one second magnetic member drives the at least one first magnetic member to rotate, the first switcher rotates relative to the rod with the first sleeve through magnetically attraction between the at least one first magnetic member and the at least one second magnetic member, and the processing unit is adapted to receive rotation information of the first switcher to obtain the information of the first sleeve rotating relative to the rod.

4. The electronic device according to claim 3, further comprising:
a first sensor disposed inside the rod, close to the first switcher, and electrically connected to the processing unit, wherein when the first sleeve is at the first position and the first switcher rotates relative to the rod with the first sleeve, the first sensor transmits a position signal of the first switcher to the processing unit to switch the function of the roller-type input device.

5. The electronic device according to claim 2, wherein the first portion of the rod further comprises a plurality of second slide rails and at least one third magnetic member, the second slide rails are recessed on the outer surface of the rod along a direction in which the rod extends, and each of the second slide rails has a front end and a back end opposite to each other, each of the front ends is connected to the first slide rail, and each of the back ends comprises a third positioning slot recessed on a bottom surface of the corresponding second slide rail, and the at least one third magnetic member is disposed inside the rod and corresponding to the back end, wherein during movement of the first sleeve from the first position to the second position, each of the first bumps moves to the corresponding third positioning slot through the corresponding second slide rail, and when the first sleeve is at the second position, the at least one third magnetic member magnetically attracts the at least one second magnetic member.

6. The electronic device according to claim 1, wherein the rod comprises an outer surface, a third slide rail recessed and surrounding the outer surface and a plurality of second positioning slots recessed at a bottom surface of the third slide rail, and the second sleeve comprises an inner surface and a plurality of second bumps located on the inner surface and corresponding to the second positioning slots, the second bumps are adapted to slide along the third slide rail to be engaged with the second positioning slots.

7. The electronic device according to claim 6, further comprising:
a second drive mechanism comprising:
at least one fourth magnetic member disposed inside the rod; and
at least one fifth magnetic member disposed at the second sleeve, the at least one fourth magnetic member being aligned with the at least one fifth magnetic member; and
a second switcher disposed inside the rod and linked to the fourth magnetic member, wherein the at least one fourth magnetic member magnetically attracts the at least one fifth magnetic member, when the second sleeve rotates, the at least one fifth magnetic member drives the at least one fourth magnetic member to rotate, the second switcher rotates relative to the rod with the second sleeve through magnetically attraction between the at least one fourth magnetic member and the at least one fifth magnetic member, and the processing unit is adapted to receive rotation information of the second switcher to obtain the information of the second sleeve rotating relative to the rod.

8. The electronic device according to claim 7, further comprising:
a second sensor disposed inside the rod, close to the second switcher, and electrically connected to the processing unit, wherein when the second switcher rotates relative to the rod with the second sleeve, the second sensor transmits a position signal of the second switcher to the processing unit to switch the function of the roller-type input device.

9. The electronic device according to claim 1, further comprising:
a first communication module disposed inside the rod and electrically connected to the processing unit.

10. An electronic system, comprising:
an electronic device
a rod having a first portion and a second portion opposite to each other, wherein the first portion comprises a touch head;
a first communication module disposed inside the rod;
a first sleeve slidably sleeved on the first portion of the rod and movable between a first position and a second position of the first portion, wherein when the first sleeve is at the first position, the first sleeve covers the touch head and is rotatable relative to the rod, and when the first sleeve is at the second position, the touch head is enabled;
a second sleeve sleeved on the second portion of the rod, wherein the second sleeve is rotatable relative to the rod; and
a processing unit disposed inside the rod and adapted to receive information of the first sleeve or the second sleeve rotating relative to the rod, wherein
when the first sleeve is at the first position, the electronic device is adapted to serve as a roller-type input device, a function of the roller-type input device being controlled according to the information of the first sleeve or the second sleeve rotating relative to the rod; and
when the first sleeve moves toward the second sleeve to the second position, the touch head is exposed from the first sleeve, and the touch head is enabled, so that the electronic device is adapted to serve as a stylus; and
a body having an accommodating slot and comprising a second communication module in a signal connection to the first communication module, and the electronic device is detachably disposed in the accommodating slot.

11. The electronic system according to claim 10, wherein the body further comprises:
a fixing member movably disposed inside the accommodating slot, the fixing member being adapted to fix a central portion located between the first portion and the second portion of the rod; and
a lever having a first end, a second end opposite to the first end and a supporting point located between the first end and the second end, wherein the second end is connected to the fixing member, and the first end is adapted to move downward to lift the fixing member connected to the second end, wherein
when the central portion of the rod is fixed to the fixing member and the fixing member is lifted, the first sleeve and the second sleeve of the electronic device partially protrude from the accommodating slot.

12. The electronic system according to claim 11, wherein the body further comprises:
a power source;
an electromagnet electrically connected to the power source; and
a magnetic member located beside the electromagnet and connected to the first end of the lever, wherein when the central portion of the rod is fixed to the fixing member and the power source is turned off, the electromagnet does not magnetically attract the magnetic member, and the first sleeve and the second sleeve of the electronic device are located inside the accommodating slot, and when the power source is turned on, the electromagnet is magnetically attracted to the magnetic member, so that the magnetic member drives the lever to move, so that the first sleeve and the second sleeve of the electronic device partially protrude from the accommodating slot.

13. The electronic system according to claim 10, wherein the rod comprises an outer surface, a first slide rail recessed and surrounding the outer surface and a plurality of first positioning slots recessed at a bottom surface of the first slide rail, and the first sleeve comprises an inner surface and a plurality of first bumps located on the inner surface, the first bumps are adapted to slide along the first slide rail to be selectively engaged with the first positioning slots.

14. The electronic system according to claim 13, further comprising:
    a first drive mechanism comprising:
        at least one first magnetic member disposed inside the rod; and
        at least one second magnetic member disposed at the first sleeve, wherein when the first sleeve is at the first position, the at least one second magnetic member is aligned with the at least one first magnetic member; and
    a first switcher disposed inside the rod and linked to the first magnetic member, wherein when the first sleeve is at the first position, the at least one second magnetic member magnetically attracts the at least one first magnetic member, when the first sleeve rotates, the at least one second magnetic member drives the at least one first magnetic member to rotate, the first switcher rotates relative to the rod with the first sleeve through magnetically attraction between the at least one first magnetic member and the at least one second magnetic member, and the processing unit is adapted to receive rotation information of the first switcher to obtain the information of the first sleeve rotating relative to the rod.

15. The electronic system according to claim 14, further comprising:
    a first sensor disposed inside the rod, close to the first switcher, and electrically connected to the processing unit, wherein when the first sleeve is at the first position and the first switcher rotates relative to the rod with the first sleeve, the first sensor transmits a position signal of the first switcher to the processing unit to switch the function of the roller-type input device.

16. The electronic system according to claim 13, wherein the first portion of the rod further comprises a plurality of second slide rails and at least one third magnetic member, the second slide rails are recessed on the outer surface of the rod along a direction in which the rod extends, and each of the second slide rails has a front end and a back end opposite to each other, each of the front ends is connected to the first slide rail, and each of the back ends has a third positioning slot recessed on a bottom surface of the corresponding second slide rail, and the at least one third magnetic member is disposed inside the rod and corresponding to the back end, wherein during movement of the first sleeve from the first position to the second position, each of the first bumps moves to the corresponding third positioning slot through the corresponding second slide rail, and when the first sleeve is at the second position, the at least one third magnetic member magnetically attracts the at least one second magnetic member.

17. The electronic system according to claim 10, wherein the rod comprises an outer surface, a third slide rail recessed and surrounding the outer surface and a plurality of second positioning slots recessed at a bottom surface of the third slide rail, and the second sleeve comprises an inner surface and a plurality of second bumps located on the inner surface and corresponding to the second positioning slots, the second bumps are adapted to slide along the third slide rail to be engaged with the second positioning slots.

18. The electronic system according to claim 17, further comprising:
    a second drive mechanism comprising:
        at least one fourth magnetic member disposed inside the rod; and
        at least one fifth magnetic member disposed at the second sleeve, the at least one fourth magnetic member being aligned with the at least one fifth magnetic member; and
    a second switcher disposed inside the rod and linked to the fourth magnetic member, wherein the at least one fourth magnetic member magnetically attracts the at least one fifth magnetic member, when the second sleeve rotates, the at least one fifth magnetic member drives the at least one fourth magnetic member to rotate, the second switcher rotates relative to the rod with the second sleeve through magnetically attraction between the at least one fourth magnetic member and the at least one fifth magnetic member, and the processing unit is adapted to receive rotation information of the second switcher to obtain the information of the second sleeve rotating relative to the rod.

19. The electronic system according to claim 18, further comprising:
    a second sensor disposed inside the rod, close to the second switcher, and electrically connected to the processing unit, wherein when the second switcher rotates relative to the rod with the second sleeve, the second sensor transmits a position signal of the second switcher to the processing unit to switch the function of the roller-type input device.

* * * * *